UNITED STATES PATENT OFFICE.

MAX HARTMANN AND MAX SEIBERTH, OF BASEL, SWITZERLAND, ASSIGNOR TO SOCIETY OF CHEMICAL INDUSTRY IN BASLE, OF BASEL, SWITZERLAND.

DIALKYLAMIDES OF NICOTINIC ACID AND PROCESS OF MAKING SAME.

1,403,117. Specification of Letters Patent. Patented Jan. 10, 1922.

No Drawing. Application filed July 6, 1921. Serial No. 482,814.

*To all whom it may concern:*

Be it known that we, MAX HARTMANN and MAX SEIBERTH, both citizens of the Swiss Republic, and residents of Basel, Switzerland, have invented new and useful Dialkylamides of Nicotinic Acid and Processes of Making Same, of which the following is a full, clear, and exact specification.

We have found that by heating a halide of nicotinic acid with a salt of a dialkylamine for several hours at a temperature of 160 to 180° C. there are obtained new dialkylamides of nicotinic acid having valuable therapeutical properties and constituting feebly colored oils soluble in water and organic solvents.

The following examples illustrate the invention:

Example 1: Nicotinic acid chloride is heated with the equivalent quantity of diethylamine hydrochloride for 2 hours in the oil bath at 160° C. There is a vigorous evolution of hydrogen chloride. The mass is dissolved in water, mixed with a solution of potassium hydroxide (1:1) and shaken with ether. The ethereal solution is dried with caustic alkali and the ether is distilled off. The residual crude diethylamide of nicotinic acid is purified by distillation in a vacuum. It is a yellowish oil of boiling point 280° C. (175° C. at 25 mm. pressure), which dissolves easily in water and organic solvents and is precipitated from its aqueous solution by concentrated alkali lye.

Example 2: Nicotinic acid (1 mol.) is converted into its chloride by means of thionyl chloride (1½ mol.) in known manner. The nicotinic acid chloride is intimately mixed with dipropylamine hydrochloride (1 mol.) and the mixture is heated to 180° C. The mass melts and evolves hydrogen chloride. After some hours it is mixed with a little water and made strongly alkaline with excess of caustic soda lye of 36 per cent. strength. The dipropylamide of nicotinic acid is extracted from the mixture with ether and the extract fractionated. The product is a yellowish oil boiling at 184° C. at 17 mm. pressure.

Example 3: Nicotinic acid bromide is heated with the equivalent quantity of piperidine hydrobromide for several hours at about 160° C. When evolution of hydrogen bromide has ceased, the mass is dissolved in water and further treated in the manner described in example 1.

The piperidide of nicotinic acid obtained by distilling the residue of the ethereal solution is a thick oil boiling at 310° C. and easily soluble in water and organic solvents.

What we claim is:

1. As new products the herein described dialkylamides of nicotinic acid, having valuable therapeutical properties and constituting feebly colored oils soluble in water and organic solvents.

2. As a new article of manufacture, the herein described diethylamide of nicotinic acid, having valuable therapeutical properties and constituting a yellowish oil boiling at 280° C. and easily soluble in water and organic solvents.

3. The herein described process for the manufacture of dialkylamides of nicotinic acid consisting in heating a halide of nicotinic acid with a salt of a dialkylamine, for several hours at a temperature of 160 to 180° C.

In witness whereof we have hereunto signed our names this 14th day of June, 1921, in the presence of a witness.

MAX HARTMANN.
MAX SEIBERTH.

Witness:
AMAND RITTER.